Aug. 16, 1960　S. B. WILLIAMS　2,949,182

ELECTRICAL COMPONENTS PACKAGE

Filed Feb. 8, 1956

INVENTOR.
SIDNEY B. WILLIAMS

BY Roland A. Dexter
HIS ATTORNEY

United States Patent Office 2,949,182

Patented Aug. 16, 1960

2,949,182

ELECTRICAL COMPONENTS PACKAGE

Sidney B. Williams, Milwaukee, Wis., assignor to Sprague Electric Company, North Adams, Mass., a corporation of Massachusetts Filed Feb. 8, 1956, Ser. No. 572,606

1 Claim. (Cl. 206—65)

This invention relates to electrical components such as capacitors, and to packaging structures for them.

Among the objects of this invention is to provide novel electric circuit component and packaging structure which simplify their manipulation by automatic-assembly machines.

In accordance with this invention an electric circuit component is provided with leads extending in predetermined directions, as for example generally parallel, to allow insertion into a circuit such as printed circuit board, by a simple movement in that direction. The component itself may have a disc-like or planar body oriented in the plane of the leads to facilitate assembly in aligned groups for convenient packaging, handling and loading into automatic-assembly machinery. These groups or cartridges may be held together by readily breakable bonding materials and/or by means of novel loading tubes.

The novel features and advantages of the present invention will become apparent to one skilled in the art from the following description in conjunction with the accompanying drawings in which.

Throughout the figures similar parts are designated by the same reference numerals together with suitable identifying suffixes.

Figure 1:
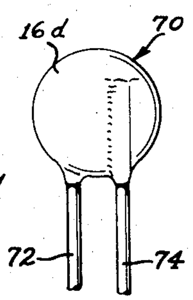
Fig. 1 is a view in elevation of a capacitor which is one embodiment of this invention.

In Fig. 1, a form of disc-capacitor 70 is shown. It includes a ceramic disc **16*d* and leads 72 and 74 secured to opposite faces of the disc. The leads 72 and 74** in Fig. 1, however, extend parallel to each other at a predetermined separation for insertion into standardized electrical circuits, such as standardized printed electrical circuits.

Figure 2:
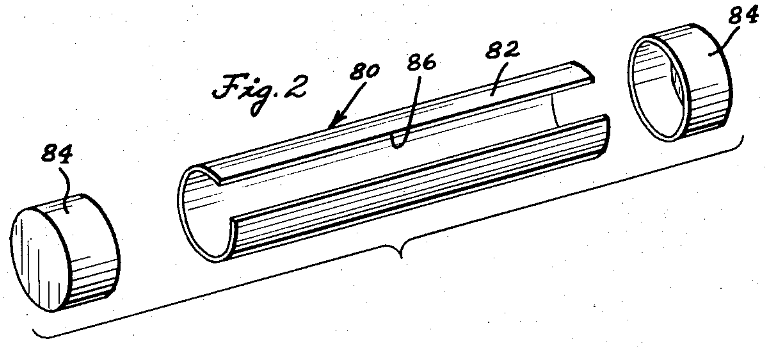
Fig. 2 is an exploded pictorial representation of a novel loading tube for the capacitor shown in Fig. 1 and a still further embodiment of this invention.

In Fig. 2 is shown a container 80 suitable for packaging disc-capacitor 70 of the type shown in Fig. 1. The container 80 is made up of a cylindrical portion 82 and two cylindrical caps 84 for sealing the capacitors within the container 80. Caps 84 can fit closely over or within the ends of the cylindrical member 82. Cylindrical member 82 includes longitudinal slot 86. When the bodies or discs **16*d* of capacitor 70 are inserted within the cylindrical member 82, the leads 72 and 74 extend outwardly through slot 86. Slot 86, therefore, provides means for aligning leads 72 and 74 in a row so that they may be conveniently provided and loaded within an automatic-assembly machine. Cylindrical member 82** may be made of a high impact polystyrene plastic. It also may be made of paper or paper impregnated with Bakelite for strengthening as well as to allow the discs to slide freely within the tube.

Figure 3:
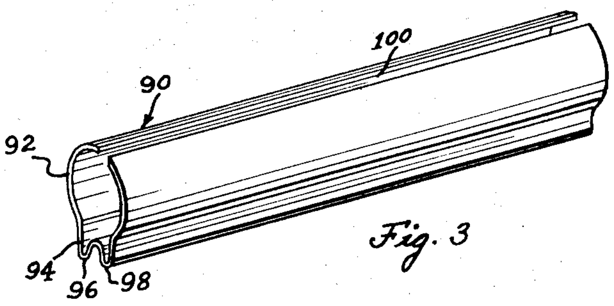
Fig. 3 is a pictorial representation of another novel loading tube for the capacitor shown in Fig. 1 and yet a further embodiment of this invention.

In Fig. 3 is shown an alternate form for constructing the container shown in Fig. 2. A cylindrical member 90 is formed of an extruded plastic or formed plastic. This plastic may, for example, also be of high impact polystyrene. This cylindrical member 90 has a partially circular cross-section as shown at 92 and a lower channel shaped portion 94, including two smaller channels or feet 96 and 98 which cooperates to form a W shaped channel in cross-section. The upper portion of the circular part of the channel member 90 is slotted at 100 to provide means for adjusting to irregularities in disc-capacitor body formation. Provision of slot 100 allows the semi-circular walls of cylindrical member 90 to yield and accept variations in size of capacitors loaded within. The feet 96 and 98 provide means for aligning the leads such as leads 72 and 74 of disc-capacitors of the type shown as capacitor 70 in Fig. 1. Parallel leads of a capacitor such as capacitor 70 may be formed with tapered legs. These tapered legs provide means for facilitating insertion of the disc capacitors in existing circuits by automatic machinery.

The form of construction shown in Fig. 3 may also be made of an assembly of different materials. The channel portion may be made of metal, aluminum for example, and the balance of paper, the separate portions being secured together. The slot one hundred of the channel member 90 can be omitted so that a somewhat stronger construction can be made of paper. In addition, the feet 96 and 98 can be joined together to make a single trough, if desired.

Figure 4:
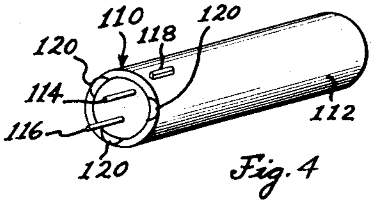
Fig. 4 is a pictorial representation of a capacitor which is a still further embodiment of this invention.

In Fig. 4 is shown another form of capacitor 110 which is suitable for convenient loading into automatic-assembly machinery by tubes. The cross-sections of these tubes will, however, be shaped to conform to the outline of the capacitor shown in Fig. 4. Capacitor 110 is formed with a cylindrical body 112 and includes leads 114 and 116 extending from the circular base of the capacitor. Lead 116 is the outside foil lead. A protuberance or key 118 is disposed on the body of capacitor 110 adjacent the outside foil lead 116. By the term adjacent to outside foil lead 116 is meant in the same radial orientation as outside foil lead 116. This key 118, therefore, provides convenient means for enabling the automatic-insertion machinery to identify or index the capacitor with its leads in the proper orientation.

Three spacer feet 120 are disposed on the base of the capacitor shell 112. These feet provide means to raise the shell and end seal slightly above the electrical chassis such as a printed wiring board to which it is connected. This eliminates the moisture and dust trap around the capacitor rim, which occurs with capacitors which rest flat upon a chassis or printed wiring board. These feet 120 also permit the use of double-sided wiring boards without causing low resistant shorts between top side conductors as a result of accumulated dust about the circumference of a capacitor.

While the constructions of the present invention are particularly suited for ceramic disc type of capacitors in which the discs are of circular, square, rectangular, elliptical or polygonal shape, they can also be used with resistors, inductors and electrolytic capacitors or capacitors of other types.

In general the leads of the above devices should be readily solderable so that they are convenient to solder to a printed circuit panel such as shown in U.S. Patent No. 2,695,315, granted November 23, 1954. The surfaces of the leads are accordingly preferred to be tin plated, either electrolytically or by hot-dipping. Instead of having the leads of ordinary wire form, they can be made of tapered construction, either in tab (sheet) or wire form. A taper of 10 to 20 degrees narrowing down to an end about 30 to 60 mils wide makes a very effective arrangement. An overall lead length of ¼ inch or less is all that is needed in this arrangement.

Ceramic capacitors can be packaged readily by fastening their leads to a stiff cardboard strip by means of adhesive tape. These strips with their secured capacitors can be placed vertically on end, assembled face to face and thereafter loaded into a carrying box having the interior shaped to receive the strips. This carrying member can be a channel-shaped or an open top box-shaped member. Finally the carrying member with its rows of strips and capacitors is packaged in a carton. The carrying member is lifted from the carton by a lifting means that may be for example a series of holes in the sides of the carrying member which cooperate with the bale-type wire handles whose ends are shaped for insertion within the holes. The handles are inserted within the holes at the opposite sides of the carrying member and extend inwardly so as to engage all of the assembled strips to facilitate lifting the loaded carrying member from within the carton.

This packaging method facilitates inspection and testing, as well as reducing breakage and abrasion of capacitors during shipment. Upon receipt at the manufacturer's plant, the strip assembly is lifted out by the handles which are then detached. The strips are then individually separated and the capacitors can be either tested in strip form or individually after separation from the strip. The leads may be precut to exact length while they are still attached to a cardboard strip. This simplifies uniform precutting of capacitor leads. This packaging method also facilitates delivery of a predetermined number of capacitors to assembly stations on a production line.

A further advantage of the broad packaging concept of the invention is its application to inventory of articles produced in an assembly line operation. By pre-designation the packed assembly can be indexed by appropriate means at determined intervals.

Obviously many modifications and variations of the present invention are possible in the light of the above teachings. It is, therefore, to be understood that within the scope of the appended claim, the invention may be practiced otherwise than as specifically described.

What is claimed is:

In a package of electrical components, the combination of: disc-shaped electrical components arranged face-to-face comprised of body portions and parallel extending leads, a tubular member containing the arranged electrical components, arcuate walls forming a cylindrical section shaped to fit around said electrical components, a channel-shaped portion formed adjacent to the arcuate portion of said tubular member conforming to the configuration of the leads and in cooperative attachment with said arcuate walls, the bottom of said channel-shaped portion being W-shaped in cross section thereby forming two smaller channels which contain said extending leads, wall edges in said tubular member defining a longitudinally extending opening on the opposite side of the cylindrical section from the channel-shaped portion, said longitudinally extending opening providing said arcuate walls with a means of adjustment to the irregularities of the body dimensions of said body portions and a low friction finish in said tubular member whereby said electrical components are free to easily fit in said cylindrical section and said components are easily removed from the tubular member for insertion in a circuit.

References Cited in the file of this patent

UNITED STATES PATENTS

| | | |
|---|---|---|
| 765,616 | Elliott | July 19, 1904 |
| 947,847 | Recht | Feb. 1, 1910 |
| 1,667,882 | Cooney | May 1, 1928 |
| 1,709,034 | Nelson | Apr. 16, 1929 |
| 1,888,314 | Framke | Nov. 22, 1932 |
| 1,999,879 | Lee | Apr. 30, 1935 |
| 2,437,640 | Hedrick | Mar. 9, 1948 |
| 2,471,650 | Pandolfi | May 31, 1949 |
| 2,619,519 | Marks | Nov. 25, 1952 |
| 2,757,792 | Shioleno | Aug. 7, 1956 |